United States Patent
Lert, Jr.

(10) Patent No.: US 7,752,146 B2
(45) Date of Patent: Jul. 6, 2010

(54) SERVICE-QUEUE-MANAGEMENT AND PRODUCTION-MANAGEMENT SYSTEM AND METHOD

(75) Inventor: John G. Lert, Jr., Quincy, MA (US)

(73) Assignee: Modiv Media, Inc., Quincy, MA (US)

( * ) Notice: Subject to any disclaimer, the term of this patent is extended or adjusted under 35 U.S.C. 154(b) by 476 days.

(21) Appl. No.: 11/607,283

(22) Filed: Dec. 1, 2006

(65) Prior Publication Data

US 2007/0127691 A1    Jun. 7, 2007

Related U.S. Application Data

(60) Provisional application No. 60/741,963, filed on Dec. 2, 2005.

(51) Int. Cl.
*G06Q 90/00* (2006.01)
*G06F 17/00* (2006.01)

(52) U.S. Cl. .................. 705/500; 705/8; 705/9
(58) Field of Classification Search ............. 705/8, 705/9, 16, 24, 500; 379/265.01, 265.05
See application file for complete search history.

(56) References Cited

U.S. PATENT DOCUMENTS

| | | | |
|---|---|---|---|
| 4,398,257 A | | 8/1983 | Paganini et al. |
| 5,006,983 A | * | 4/1991 | Wayne et al. .................. 705/8 |
| 5,245,163 A | | 9/1993 | Bar-Yehuda |
| 5,295,064 A | * | 3/1994 | Malec et al. .................. 705/1 |
| 5,502,806 A | | 3/1996 | Mahoney et al. |
| 5,504,675 A | * | 4/1996 | Cragun et al. ................. 705/14 |
| 5,866,890 A | | 2/1999 | Neuner |
| 5,974,393 A | | 10/1999 | McCullough et al. |
| 6,023,681 A | | 2/2000 | Whitt |
| 6,059,184 A | | 5/2000 | Ahlström et al. |
| 6,435,407 B1 | | 8/2002 | Fiordelisi |
| 6,496,580 B1 | * | 12/2002 | Chack .................. 379/266.01 |

(Continued)

FOREIGN PATENT DOCUMENTS

DE    10118766    3/2006

(Continued)

OTHER PUBLICATIONS

Anon., "United Airlines: United Continues to Leverage Technology to Improve the Custoemr Experience; United Eliminates Paper Tickets," M2 Presswire, Aug. 8, 2002.*

(Continued)

*Primary Examiner*—Nicholas D Rosen
(74) *Attorney, Agent, or Firm*—Fulbright & Jaworski L.L.P.

(57) ABSTRACT

System and method for integrating multiple customer ordering channels into a single service queue to obtain goods or services from a provider includes enabling customers to request service for goods or services from the provider using multiple ordering channels, and arranging the service requests placed using the ordering channels in a single service queue based on the time at which each is placed regardless of the ordering channel used. The ordering channels may include one or more ticket dispensers which dispenses tickets having the next number in the service queue to waiting customers, one or more computerized ordering systems which enable ordering of goods or services from the provider via a computer or other processing device, and combinations thereof.

35 Claims, 14 Drawing Sheets

U.S. PATENT DOCUMENTS

| | | | |
|---|---|---|---|
| 6,694,009 B1 * | 2/2004 | Anderson et al. ...... 379/266.06 |
| 7,242,307 B1 * | 7/2007 | LeBlond et al. .......... 340/573.1 |
| 2002/0143655 A1 * | 10/2002 | Elston et al. .................. 705/26 |
| 2002/0156682 A1 * | 10/2002 | DiPietro ....................... 705/16 |
| 2003/0061078 A1 | 3/2003 | Shimosako et al. |
| 2003/0188300 A1 | 10/2003 | Patrudu |
| 2004/0059614 A1 | 3/2004 | Brown et al. |
| 2004/0076282 A1 * | 4/2004 | Leijonhufvud ......... 379/265.02 |
| 2004/0193526 A1 | 9/2004 | Singer et al. |
| 2004/0225397 A1 * | 11/2004 | Gotfried ..................... 700/111 |
| 2004/0252820 A1 * | 12/2004 | Faber et al. ............ 379/201.12 |
| 2005/0080651 A1 | 4/2005 | Morrison et al. |
| 2005/0125278 A1 | 6/2005 | Vajracharya et al. |
| 2005/0125439 A1 | 6/2005 | Nourbakhsh et al. |
| 2005/0129214 A1 * | 6/2005 | Tyagarajan et al. .... 379/265.04 |
| 2007/0201673 A1 * | 8/2007 | Annadata et al. ....... 379/265.01 |
| 2008/0189173 A1 * | 8/2008 | Bakar et al. ................... 705/14 |

FOREIGN PATENT DOCUMENTS

| | | |
|---|---|---|
| EP | 00195587 | 3/1986 |
| EP | 01248448 A2 | 10/2002 |
| WO | WO-02/45438 | 6/2002 |
| WO | WO-02/077928 | 10/2002 |
| WO | WO 2004012030 A2 | 2/2004 |
| WO | WO-2006/110650 | 10/2006 |
| WO | WO-2007/064996 | 6/2007 |

OTHER PUBLICATIONS

International Search Report and Written Opinion issued for PCT/US2006/046235; Dated: Aug. 8, 2008; 15 Pages.

International Search Report and the Written Opinion issued for PCT/US2008/085221, dated Mar. 3, 2009; 11 pages.

* cited by examiner

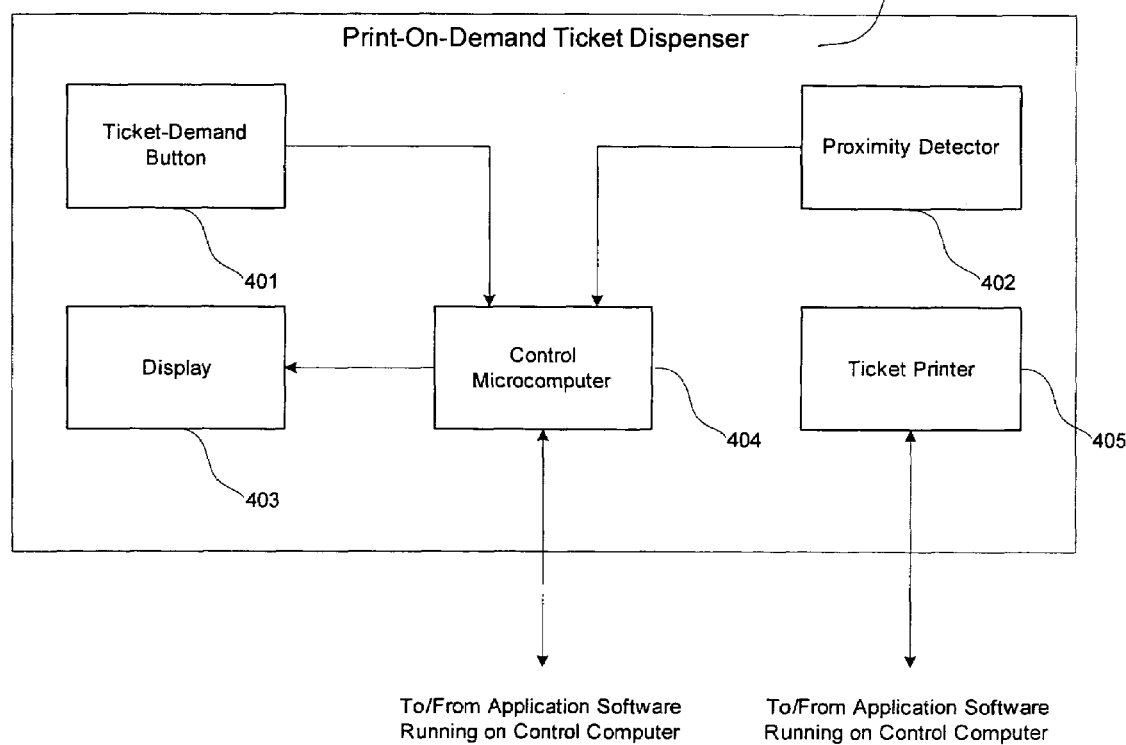

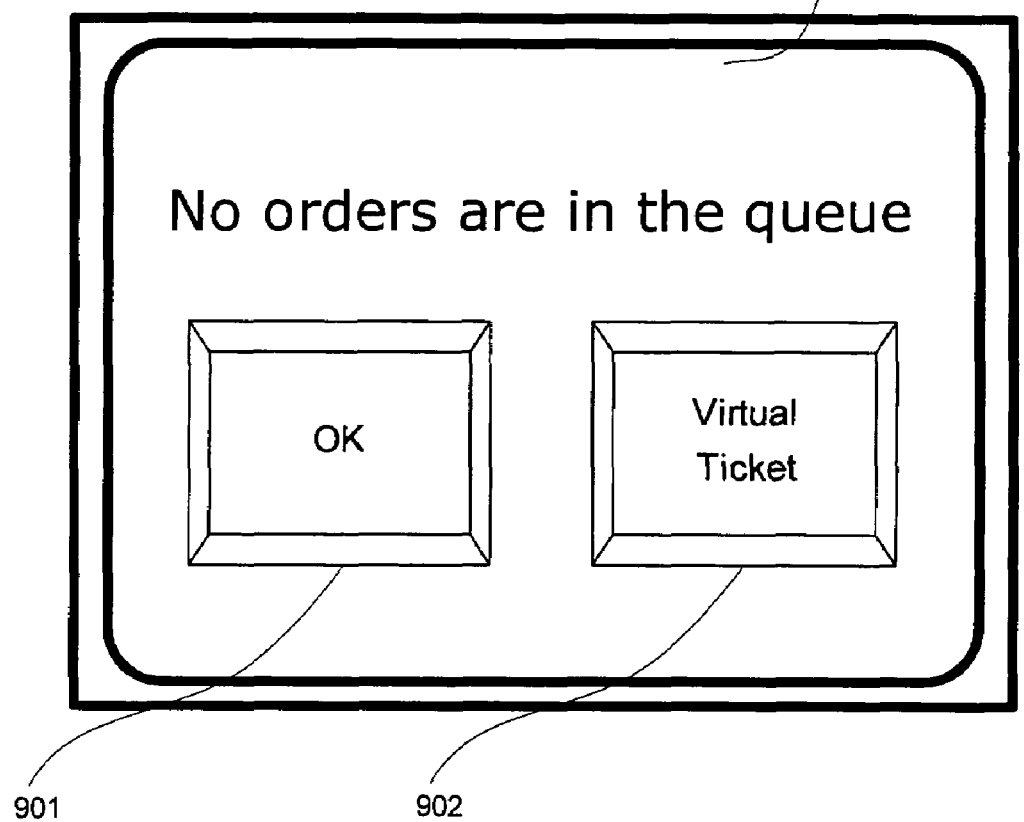

FIG. 10a

| | |
|---|---|
| Standard Fulfillment Minutes per Item | 2.1 |

| Day/Daypart | Standard # Items per Order |
|---|---|
| Weekend/All Hours | 3.2 |
| Weekday/Evening | 3.0 |
| Weekday/Non-Evening | 2.5 |

| Day/Daypart | Standard Fulfillment Minutes per Order |
|---|---|
| Weekend/All Hours | 6.7 |
| Weekday/Evening | 6.3 |
| Weekday/Non-Evening | 5.3 |

FIG. 10b

| Name of Service Person | Productivity Index |
|---|---|
| John | 1.1 |
| Mary | 1.0 |
| Fred | 0.9 |

FIG. 10c

| Queue Number | Ordering Channel | # of Items in Order | Standard Fulfillment Minutes |
|---|---|---|---|
| 55 | Counter | #NA | 6.3 |
| 56 | Kiosk | 4 | 8.4 |
| 57 | Counter | #NA | 6.3 |
| 58 | Kiosk | 3 | 6.3 |
| 59 | Kiosk | 5 | 10.5 |
| 60 | Counter | #NA | 6.3 |

FIG. 10d

|  | John | Mary | Fred |
|---|---|---|---|
| Current Clock Time | 5:32:00 PM | 5:32:00 PM | 5:32:00 PM |
| Predicted time free | 5:34:42 PM | 5:32:00 PM | 5:35:44 PM |
| Next queue number | 56 | 55 | 57 |
| Predicted fill minutes | 9.2 | 6.3 | 5.7 |
| Predicted time free | 5:43:56 PM | 5:38:18 PM | 5:41:24 PM |
| Next queue number | 60 | 58 | 59 |
| Predicted fill minutes | 6.9 | 6.3 | 9.5 |
| Predicted time free | 5:50:51 PM | 5:44:36 PM | 5:50:51 PM |

FIG. 10e

| Queue Number | Est. Order Start Time | Est. Order Completion Time | Est. Queue-Waiting Time | Est. Time to Completion |
|---|---|---|---|---|
| 55 | 5:32:00 PM | 5:38:18 PM | 0:00:00 | 0:06:18 |
| 56 | 5:34:42 PM | 5:43:56 PM | 0:02:42 | 0:11:56 |
| 57 | 5:35:44 PM | 5:41:24 PM | 0:03:44 | 0:09:24 |
| 58 | 5:38:18 PM | 5:44:36 PM | 0:06:18 | 0:12:36 |
| 59 | 5:41:24 PM | 5:50:51 PM | 0:09:24 | 0:18:51 |
| 60 | 5:43:56 PM | 5:50:51 PM | 0:11:56 | 0:18:51 |
| 61 (next) | 5:44:36 PM |  | 0:12:36 |  |

SERVICE-QUEUE-MANAGEMENT AND PRODUCTION-MANAGEMENT SYSTEM AND METHOD

CROSS REFERENCE TO RELATED APPLICATION

This application claims priority under 35 U.S.C. §119(e) of U.S. provisional patent application Ser. No. 60/741,963 filed Dec. 2, 2005, incorporated by reference herein.

FIELD OF THE INVENTION

The present invention relates to a service-queue-management and production-management system and method intended to support real-time order-fulfillment in a service operation in which customers may place orders through multiple ordering channels. A full-service Deli counter within a retail store (e.g. supermarket), where customers can either place an order directly to service personnel or through an electronic ordering system, is used as an exemplar in this specification, but the invention is not limited in scope to this single use. For purposes of this invention, it is useful to distinguish the request for service from the placement of an order: the request for service creates a service queue, i.e., a relative priority for each customer within a set of customers awaiting service, whereas the placement of the order is simply the communication by the customer to the service provider of the specific content of the order to be fulfilled or services to be provided.

BACKGROUND OF THE INVENTION

Almost all supermarkets with full-service Deli departments use a manual "call-forward" queue-management system such as the "Turn-O-Matic" system sold by the Take-A-Number, Inc. Each customer pulls off a sequentially-numbered paper ticket from a preprinted roll in a dispenser to establish priority in a "first-come-first-served" service queue. Each ticket effectively represents a request for service by the service personnel to fulfill an order for goods, and service personnel satisfy these requests for service by "calling forward" each ticket number to be served in sequence, usually by verbally announcing the queue number and pushing a button to increment the "Now Serving" number on an overhead sign. The customer then answers the call and places the order with the service person, usually verbally, for immediate fulfillment.

More and more supermarkets are also offering customers the option of placing their Deli orders through computerized ordering software via a computer, e.g. a "kiosk" computer. Each placement of an order through such computerized means is also a request for service, and the computer acts as an intermediary for the customer in actually placing the order with a service person for fulfillment, usually by printing the contents of the order on a printer behind the deli counter. In theory, the use of such computer-ordering systems should provide significant benefit to both the customer and the retailer. Customers can benefit by saving time, since they do not have to wait in line to place their order, and also by being able to take as much time as they want to browse and order items. The retailer can benefit by reducing labor costs, since the service person doesn't have to take time to interact with the customer, and also by increasing sales. The increase in sales is due to two factors. First, some customers will place their order through a computer who would otherwise not be willing to wait in line. Second, customers are known to place larger orders through a computer than at the counter, primarily because they don't feel pressured by customers behind them in the queue to complete their order quickly and take more time to browse and think of more items to buy.

However, managing customer-service levels using queue-management and customer-ordering systems as described above is complicated by two major problems: lack of service-level performance information, especially in real time, and the fact that "counter customers" and "kiosk customers" create two separate and competing service queues. The result of these problems is reduced profits due to lost Deli sales, higher operating costs, and diminished benefit from those computerized ordering systems.

Prior-art electronic call-forward queue-management systems, such as is described in U.S. Pat. No. 6,059,184 or those sold by market leader Q-Matic AB of Sweden, can provide a wealth of real-time service-level performance data, and can also provide another significant customer benefit by displaying an estimate of the queue-waiting time for a new customer joining the queue, and can manage multiple different service queues. However, all such prior-art systems support only one ordering channel for any given service queue and so can provide this information only for customers in that channel. In an environment with multiple ordering channels, this lack of visibility of the interaction between the two service queues becomes problematic. For example, measurement of order-fulfillment times and server-productivity, as well as estimates of queue-waiting times, will be significantly in error if the service personnel are filling orders from both counter customers and kiosk customers but the queue-management system that is performing the measurement only "knows" about the counter customers.

A much more severe problem not solved by prior-art, single-channel queue-management systems is that of rationalizing and systematizing the service priority between the multiple channels. Since the same pool of service associates must satisfy service requests from both counter customers, who are waiting in the ticketed call-forward service queue, and from kiosk customers, whose orders have been printed by the deli printer, these parallel ordering channels create two separate queues that compete with each other for service. Without any systematic method of assigning relative priority of service between the service requests in the different queues, service personnel are forced to use their own best judgment in the allocation of their services. Especially during periods of peak demand, there will be a natural tendency for them to give priority to counter customers, for two reasons. First, counter customers are more visible, since they are standing right across the counter, whereas kiosk customers are present only in the form of paper coming out of the printer. (As queue-waiting times increase, counter customers may well become more vocal as well.) Second, service personnel will likely rationalize that they can delay in filling orders from kiosk customers since those customers are shopping and don't need their orders filled as quickly.

This situation gives rise to a number of unfortunate consequences. Kiosk customers will all too often return to pickup their Deli order at the conclusion of a shopping trip only to find that it has not yet been filled. Such customers will conclude correctly that they cannot rely on their kiosk order being filled and will frequently either revert back to waiting in the counter-service queue on future shopping trips or stop ordering from the Deli altogether. In most cases in which the fulfillment of a Deli order is so late that a customer is forced to leave the store without it, the order will have to be thrown away, resulting in waste of both the product and the labor cost of fulfillment. On the other hand, counter customers may become offended when they see service personnel turning to fulfill orders from the printer instead of calling forward counter customers, thereby perceiving service to be unfair, perhaps even to the point of verbally criticizing the service staff for this perceived slight and/or discontinuing patronage of the Deli (or even the store). The pressures of balancing service between the two queues, using their own best judgment, places considerable stress on service personnel and degrades job satisfaction. One strategy of coping with this stress, often exhibited by these workers, is to sabotage the computerized ordering system in some way. For example, they may place a bag over the kiosk computer screen with "Out of Order" written on it, or disable the printer. Reducing the availability of the computerized ordering system reinforces the customers' perception that it is not a reliable ordering channel, further diminishing its benefits.

OBJECTS AND SUMMARY OF THE INVENTION

It is an object of the present invention to provide a new service-queue-management and production-management method and system.

In order to achieve this object, a method for integrating requests for service through multiple customer ordering channels into a single service queue to obtain goods or services from a provider in accordance with the invention includes enabling customers to request the service of fulfilling an order for goods or services from the provider that can be placed through a plurality of ordering channels, and arranging the service requests in a single queue based on the time at which each service request is placed regardless of the ordering channel used. The ordering channels may include direct counter service, the request for which is made through one or more ticket dispensers which dispense tickets having the next number in the service queue to waiting customers, and one or more computerized ordering systems which enable customers to simultaneously request service and place their orders for goods or services via a computer or other processing device, and combinations thereof.

A system for integrating requests for service through multiple customer ordering channels into a single service queue to obtain goods or services from a service location of a provider in accordance with the invention includes a control computer, one or more ticket dispensers each connected to the control computer and arranged to dispense tickets upon activation, and one or more computerized ordering systems each connected to the control computer and enabling placement of orders for goods or services using a computer or other processing device linked to the control computer. The control computer manages the service queue and more particularly, assigns the next number in the service queue to an order placed via a computerized ordering system or to a ticket dispensed from a ticket dispenser based on the time at which the ticket is dispensed from the ticket dispenser or the order is placed via the computerized ordering system.

A production-management method for monitoring individuals fulfilling orders for goods or services at a provider of such goods or services in accordance with the invention includes assigning each individual service person a unique identification, receiving requests for service to fulfill orders placed via multiple and different ordering channels, placing the service requests into a single queue based on the time at which each is placed or received by the provider regardless of the ordering channel used, associating each service request with one of the uniquely identified individual service persons to fulfill that order, tracking the time spent by the individual service persons in fulfilling each order, and analyzing the performance of the service persons individually and as a group based on their order-fulfillment times.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein:

FIG. 4a shows a block diagram of a preferred embodiment of a print-on-demand ticket dispenser.

FIG. 9a shows an example of what would be displayed on the screen of the non-RFID transaction terminal shown in FIG. 5 when an associate attempts to execute a "next-in-queue" transaction when there are no orders in the service queue.

FIGS. 10a, 10b, 10c, 10d and FIG. 10e illustrate an example of a predicted waiting time simulation according to the present invention.

DETAILED DESCRIPTION OF THE INVENTION

Figure 1:
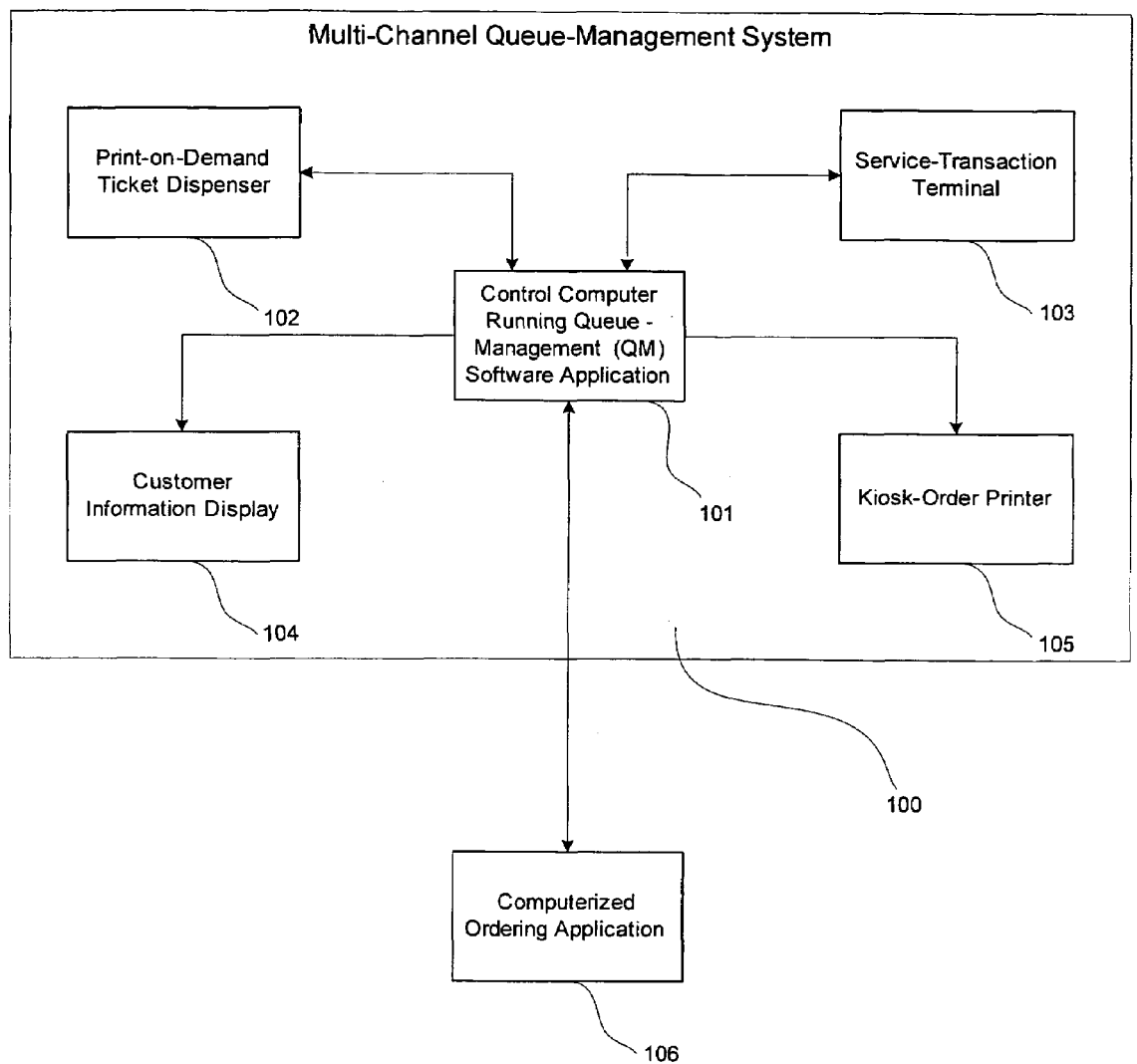
FIG. 1 shows a high-level block diagram of functional components of the present invention, plus the presence of an electronic ordering channel 106.

Referring to the accompanying drawings, an automated call-forward queue-management system in accordance with the invention (a) creates a single service queue for all customers regardless of which ordering channel they use, e.g. whether they are placing an order at the counter or through a computer, (b) measures service-levels across all ordering channels, capturing all critical service-level parameters in real time, so that the retailer can far more effectively and efficiently ensure the delivery of service to the satisfaction of customers, and (c) creates realistic service-level expectations by customers. By simultaneously performing these actions, the present invention increases sales, reduce costs, and maximizes the benefits from computerized ordering systems.

Theory of Operation

The system of the present invention is characterized by the following key features and capabilities:

Sequential queue numbers are assigned to all service requests by customers on a first-come-first-served basis, whether the customer wishes to order at the counter or through a computer. The standalone dispenser of preprinted queue tickets in the typical non-automated call-forward system is replaced by a print-on-demand ticket dispenser. As in the current system, customers wishing to place an order at the counter request service by obtaining a queue ticket, but they do so by pressing a button on the dispenser rather than pulling one off of a preprinted roll of tickets. When the button is pushed, a queue ticket is printed with the next number in its service queue. Customers placing orders through a kiosk or other computerized ordering system are also assigned queue number in the same first-come-first-served sequence. In other words, placing an order through the kiosk is an equivalent service request from a queue-management point of view as pressing the ticket-demand button on the ticket dispenser.

The system tracks the number of service personnel fulfilling orders at every moment, tracks which individual service person fulfills each order (though not necessarily by name), and captures the start and completion times—and therefore total fulfillment time—of each order.

The system tracks the number of service requests in queue at each moment in time, and also measures the queue-waiting time of each order. It also captures the number of "abandoned" service requests, i.e. customers that take a ticket but don't actually answer the call to place an order.

By tracking the number of service associates in the order-fulfillment pool at any given time and estimating the expected fulfillment time for each order, the system is able to estimate with reasonable accuracy the queue-waiting time of the next customer to join the queue. Communicating this predicted waiting time to the customer eliminates the need for the customer to guess, creating instead a realistic expectation of queue-waiting time.

Because all of this information is captured and tracked in real time, the system is able to send an alert to managers in the store when the predicted wait time exceeds a specified threshold, enabling them to react quickly by redeploying staff from elsewhere in the store to fulfill orders, thereby ensuring that acceptable customer-service levels are maintained.

System Configuration

A block-diagram of a non-limiting embodiment of a system (100) of the present invention is depicted in FIG. 1. It comprises the following primary components:

A control computer running the Queue-Management (QM) software application (101), with a communications interface to all of the system peripherals plus an interface to one or more computerized-ordering software applications (106) such as those that interact with customers placing a kiosk order.

One or more print-on-demand Ticket Dispensers (102), typically located in the customer area near the service counter One or more Service-Transaction Terminals (103) distributed in the order-fulfillment work area behind the service counter One or more Order Printers (105) also distributed in the order-fulfillment work area behind the service counter One or more Customer-Information Displays (104), typically mounted overhead within the service-counter area for easy view by waiting or prospective customers.

Each of these system components is discussed in further detail below.

Queue-Management (QM) Application

The QM Application (101) software is the heart of the queue-management system. It performs the following key functions:

Controls the operation of the peripheral components of the system, including the Ticket Dispenser(s) (102), Service-Transaction Terminal(s) (103), the Customer-Information Display(s) (104), and the Order Printer(s) (105).

Communicates with computerized ordering software applications (106) so that service requests from counter customers and kiosk customers can be integrated into a single service queue.

Predicts queue-waiting times for each customer in the service queue.

Generates a variety of service-level and productivity reports to managers, providing detailed visibility into service operations.

Alerts managers when exception conditions occur, especially unacceptably long predicted queue-waiting times.

Print-On-Demand Ticket Dispenser

Figure 2:
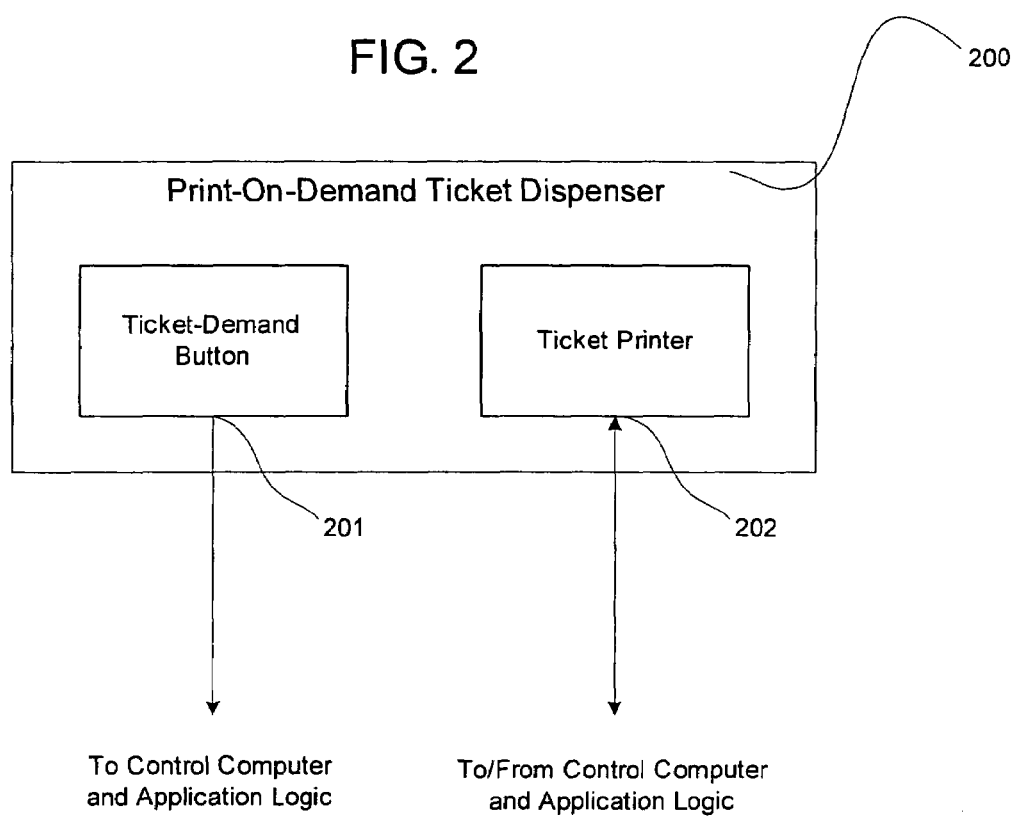
FIG. 2 shows a block diagram of one embodiment of a print-on-demand ticket dispenser, one of the components of the present invention.

Referring now to FIG. 2, a Ticket Dispenser (200) is used to reserve a position in the queue by customers wishing to place an order at the counter. The customer obtains a queue ticket by pressing a button (201), which causes the QM Application (101) to print a ticket for the customer on a printer (202). The customer removes the printed ticket from the printer (202), holds it until the queue number is called forward for service, presents the ticket to the service person to validate service priority, and places the order directly with the service person.

Figure 3:
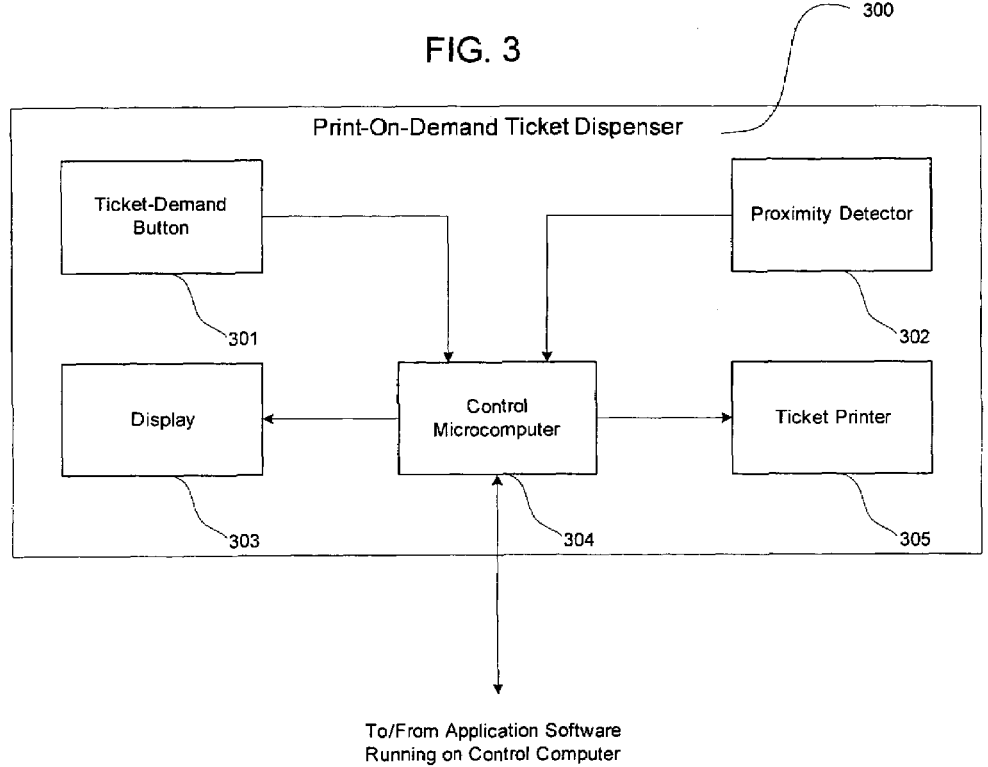
FIG. 3 shows a block diagram of a more complex embodiment of a print-on-demand ticket dispenser.

The Ticket Dispenser (200) can have a variety of configurations, ranging from simple, as depicted in FIG. 2, to complex, as depicted in FIG. 3. In a simple embodiment (FIG. 2), it includes the button (201) that, when pressed by a customer wishing a ticket, inputs a signal to the QM Application (101) running on the control computer, and a ticket printer (202) that receives and prints information from the QM Application (101). In a more complex embodiment shown in FIG. 3, the Ticket Dispenser (300) is itself a subsystem including a control microcomputer (304) that communicates with the QM Application (101) and controls a set of its own peripherals. One of these peripherals is the same demand button (301) shown in FIG. 2, which is pressed by a customer desiring a ticket but in this configuration inputs its signal to the control microcomputer (304) rather than directly to the QM Application (101).

Instead of a button, the ticket dispenser can include any other type of device which is manually activated by a customer to indicate an intent to place an order by requesting and receiving a ticket with the next number in the queue.

Similarly, another peripheral within the ticket-dispenser (300) subsystem is the ticket printer (305), which also in this configuration is directly controlled by the control microcomputer (304) rather than the QM Application (101).

Two additional peripherals shown in FIG. 3 but not shown in FIG. 2 are a proximity detector (302) and a display screen (303). The display (303) shows, at a minimum, the next queue number to be issued and the predicted queue-waiting time for that queue number, and can also display marketing messages, instructions, etc. The proximity detector (302) is preferably a standard sensor that works by emitting some form of radiated energy (such as infrared light or ultrasonic sound) and detecting the reflection of that energy off the body of a person standing directly in front of the dispenser (300). The purpose of this combination of peripherals is to measure the number of customers who approach the ticket dispenser (300) (as determined by the proximity detector (302)) without requesting a ticket. Such a sequence of events would be consistent with a customer considering taking a ticket for counter service, but then deciding not to do so, because of dissatisfaction with the predicted queue-waiting time shown on the display. This information would allow for relatively precise determination of a maximum allowable predicted-wait-time threshold that results in an economically optimal service level.

Figure 4B:
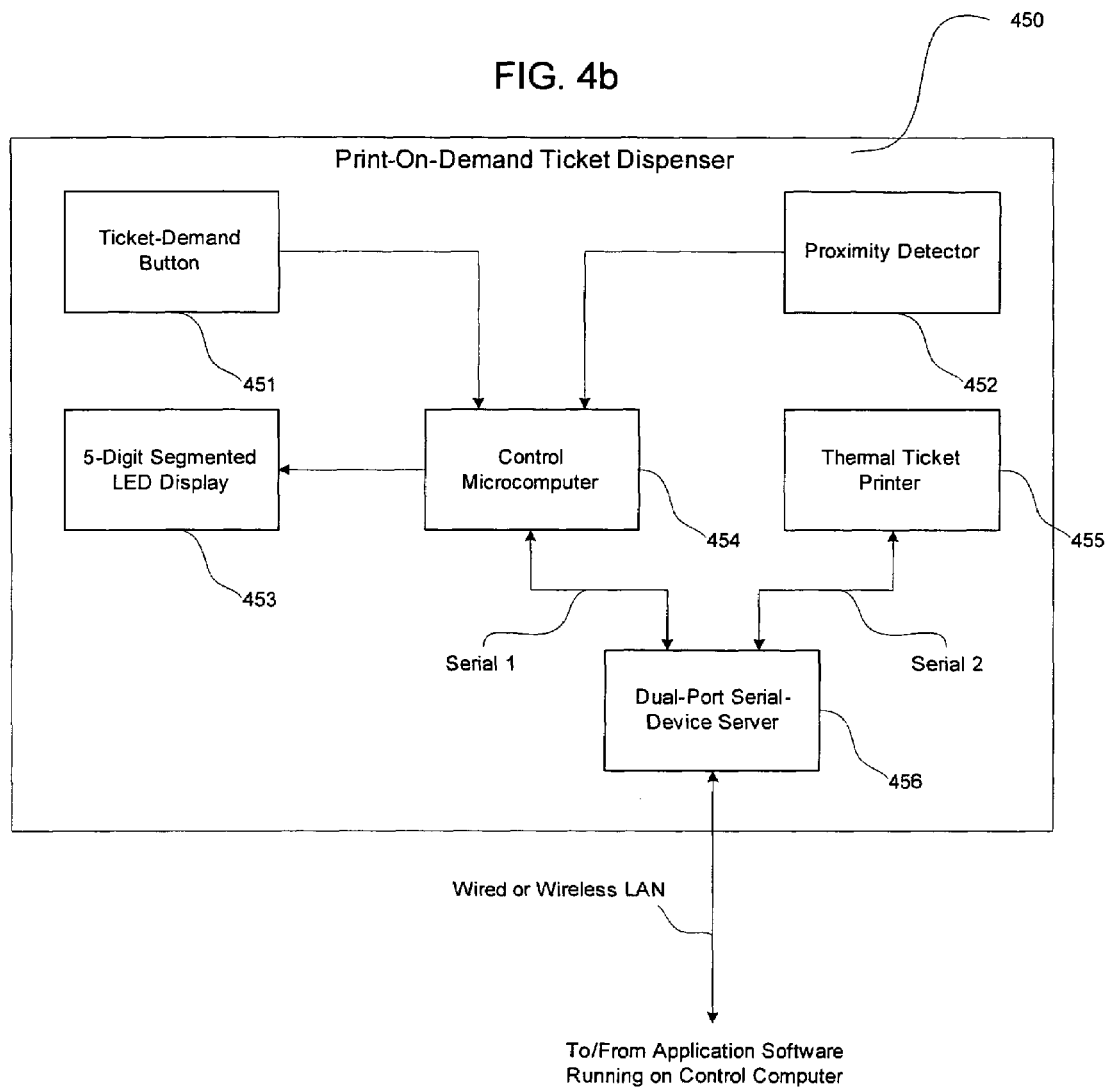
FIG. 4b shows a more specific implementation of this embodiment.

The embodiment shown in FIG. 4a is a preferred embodiment that combines features of both embodiments shown in FIG. 2 and FIG. 3. As in FIG. 3, there is a control microcomputer (404) that controls certain peripherals (button (401), display (403), proximity detector (402)) and communicates with the QM Application (101), but it does not control the ticket printer (405), which has its own direct communications link to the QM Application (101), as in FIG. 2. The button (401), proximity detector (402), display (403), control microprocessor (404) and ticket printer (405) can be situated in a common housing. An advantage of this embodiment is that the control microcomputer (404) in FIG. 4a can be a much simpler, lower-cost component than the one in FIG. 3 precisely because it does not have to run complex print-driver software. A more specific implementation of this embodiment is shown in FIG. 4b, in which the control microcomputer (454) is a very simple, low-cost single-chip microcontroller such as the Atmel AT89C51RD2, running no operating system. The display includes five segmented numeric LED display (453), three digits for queue-position number and two digits for predicted wait time. The ticket printer (455) in this preferred embodiment is one that uses thermal printing technology, such as the Swecoin TTP2010. The separate communication channels between the QM Application (101) and both the microcontroller (454) and the printer (455) is accomplished through a dual-port device server (456) such as the Lantronix Wi-Port. This module essentially converts serial message packets to local-area network (LAN) message packets and LAN packet to serial message packets, and can support two separate serial devices through two serial ports. In this embodiment, then, the microcontroller (454) communicates via one of the two serial ports and the printer (455) via the other, so that each effectively has its own connection to the QM Application (101) over the network. The microcontroller (454) can thus receive an input from either the button (451) or proximity-detector (452) and transmit either a ticket-print request or a customer-detection event to the QM Application (101), respectively, and can also receive data to display on the segmented LED numeric display (453). The QM Application (101) can also drive the thermal ticket printer (455) directly through the network connection and device server (456). The button (451), proximity detector (452), display (453), control microprocessor (454), ticket printer (455) and server (456) can be situated in a common housing.

Service-Transaction Terminal

The QM Application (101) interacts with service personnel by means of one or more Service-Transaction Terminals (103) located in the work area behind the service counter in order to call forward orders for service, associate a specific service person with each order, and capture the start and completion times (and hence fulfillment time) of each order.

In order for the QM Application (101) to reliably estimate queue-waiting times for customers considering joining the queue, it must know precisely how many people are in the pool of service personnel filling orders. In typical prior-art electronic call-forward queue-management systems, a separate transaction terminal, each with a unique internal identifier, is dedicated to each server, so that the number of different transaction terminals interacting with the application software provides the number of service personnel. This methodology works in an environment in which the service personnel remain at a stationary point of service, e.g. a bank teller, but is not practicable in a more dynamic environment in which the service personnel move around the work area fluidly, as is the case in a full-service deli. To solve this problem, the present invention includes the step of uniquely identifying the service person with each transactional input from a Service-Transaction Terminal (103), so that any service person can use any one of multiple such terminals (103) for any transaction.

There are at least two modes of uniquely identifying servers: named identification (e.g. "John Jones", "Mary Smith", etc.), and anonymous identification (e.g. "Server 1", "Server 2", etc.). Named identification has the advantage of enabling managers to measure and track the productivity of each worker for purposes such as performance evaluation, compensation, and training, but anonymous identification adequately enables the application (101) to track how many people are in the server pool at any given time for the purpose of estimating queue-waiting times.

At least two embodiments of the Service-Transaction Terminal (103) are envisioned, which use different methods to identify the service person with each transaction.

Non-RFID Embodiment

Figure 5:
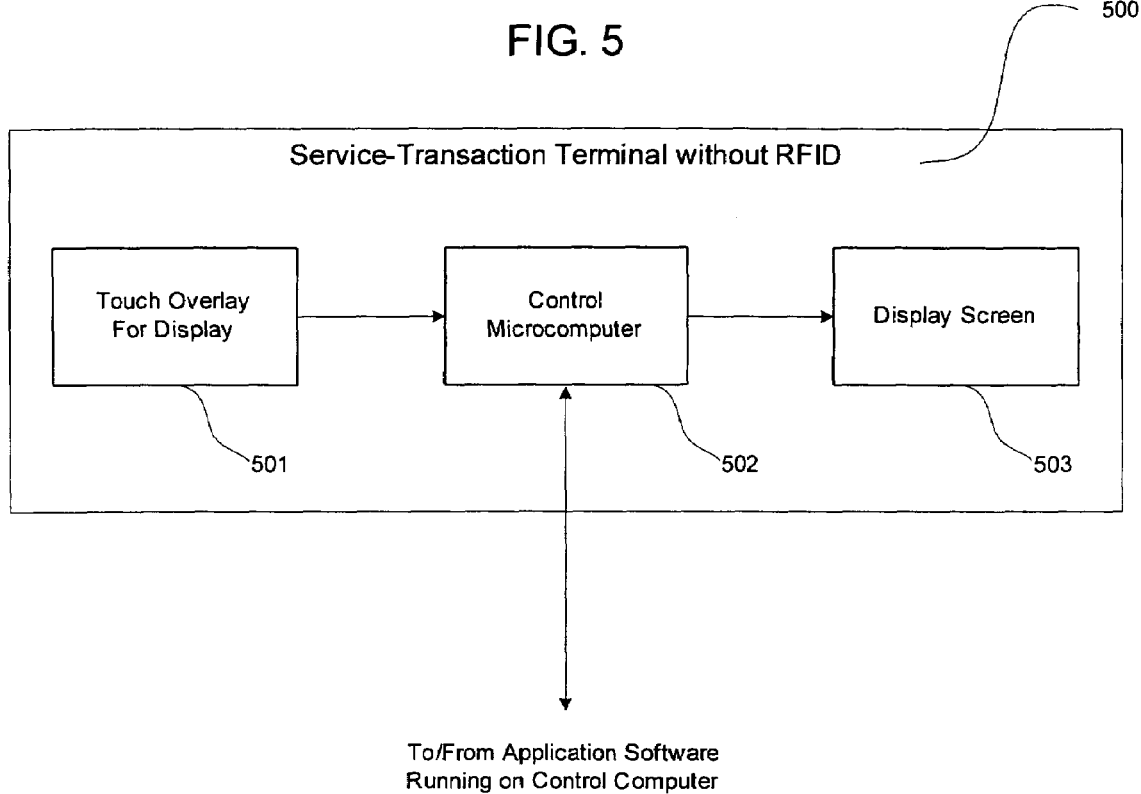
FIG. 5 shows a block diagram of a non-RFID embodiment of service transaction terminal.
Figure 6:
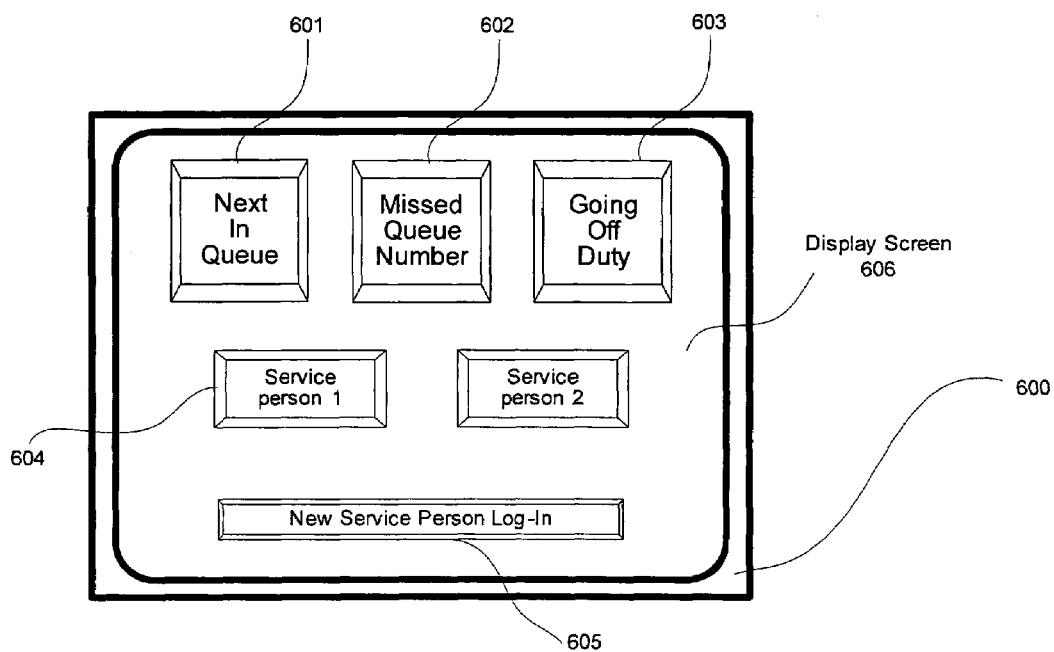
FIG. 6 shows an example of what would be displayed on the main screen of the transaction terminal described in FIG. 5.

The embodiment shown in FIG. 5 includes a control microcomputer (502) with a display (503) and touch-sensitive screen overlay (501), a combination commonly known as a touch-screen (500). With this embodiment, service personnel use the touch-screen interface to log into and out of the server pool and to identify themselves with each transaction. As depicted in FIG. 6, the "Main Screen" (600) displayed on the Terminal (500) will contain the following graphical action objects:

An identification object (604) assigned to each service person logged into the system, with either the person's name (named-ID mode) or with some anonymous form of graphical differentiation (anonymous-ID mode). These objects (604) are used to identify the server conducting each transaction. Except for New-Server-Login (605), all transactions require the service person to first touch his/her individual ID object (604), and then one of three Service Transaction buttons.

A "New-Server Login" button (605) object used by service personnel to join the active server pool. A service person entering the pool touches this button (605) object, whereupon the QM Application (101) displays either a set of named identification objects for all service personnel registered to use the system (named-ID mode), or set of anonymous ID objects (anonymous-ID mode). The service person selects the ID object to be used to identify him/her when conducting transactions.

Three Service-Transaction buttons:
"Next-In-Queue" button (601) is used to call forward the next customer in the service queue.
"Missed-Queue-Number" button (602) is used to serve a customer who missed the call forward of his/her queue number when originally announced but has returned to place an order.
"Going Off Duty" (603) button is used to take a service person out of the active server pool.

RFID-Enabled Embodiment

Figure 7:
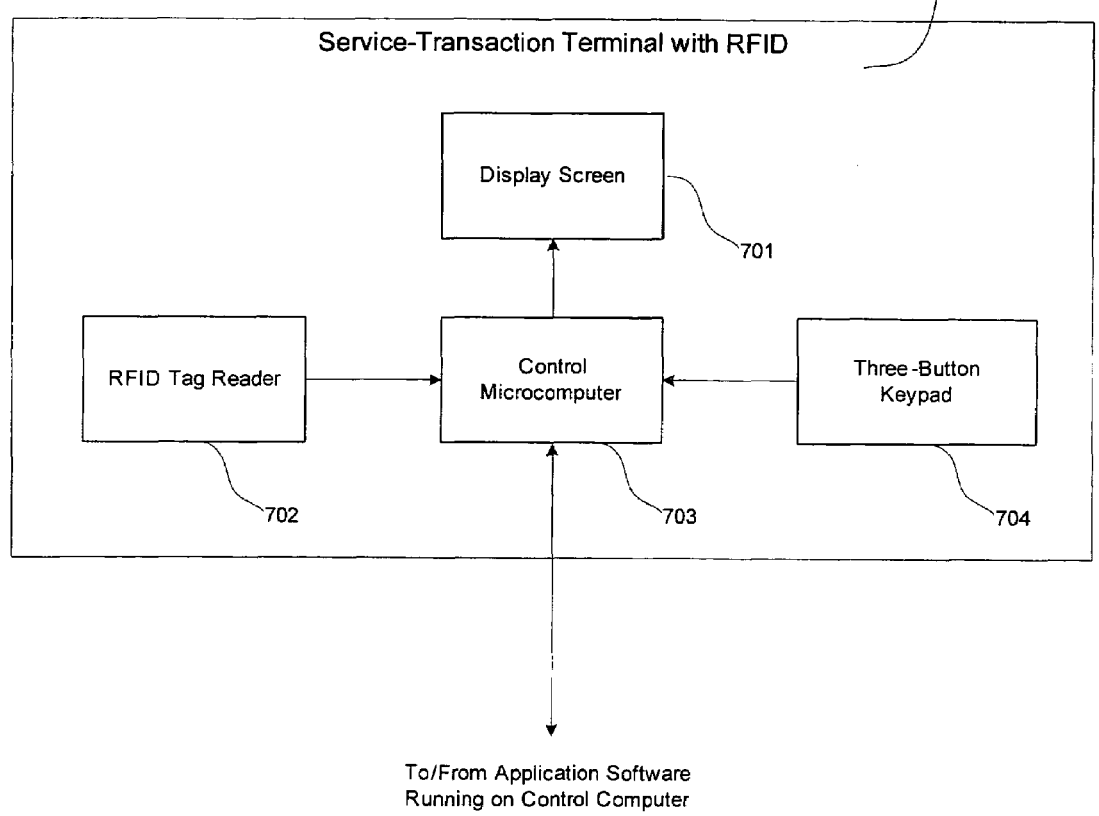
FIG. 7 shows a block diagram of an RFID-enabled embodiment of service transaction terminal.

An alternative embodiment of the Service-Transaction Terminal (700), depicted in FIG. 7, uses Radio Frequency Identification (RFID) as the mechanism for identifying service personnel, and requires that a service person must be wearing an RFID tag in order to interact with the Terminal (700). This is a preferred embodiment of the Transaction Terminal (700) primarily because it significantly simplifies the process whereby the service personnel interact with the system, since the identification step is transparent to the user. The RFID tag worn by the service personnel is preferably a bracelet, which is easily detachable and which can be read at very short range during an interaction, but the tag could alternatively be embedded in a name tag or even within the fabric of a jacket or apron (especially at the end of a sleeve, which would be an equivalent location to the bracelet). The named mode of identification would require that a specific unique RFID tag be assigned to each individual service person and only worn by that person. In the anonymous mode of identification, by contrast, there could be a common set of RFID tags, any one of which could be worn at any given time by any service person, enabling the system to know the number of different service personnel fulfilling orders, and track each one individually, without knowing the named identity of any of those people.

As depicted in FIG. 7, the RFID-enabled embodiment of the Service-Transaction Terminal (700) includes a control microcomputer (703), a display screen (701), a three-button keypad (704), and an RFID-tag reader (702). (While it would certainly be possible to use a touch-screen (500) for input, as in the alternative embodiment shown in FIG. 5 and discussed above, the 3-button keypad (704) is a more reliable and less expensive input means.) One type of RFID reader is commonly referred to as an interrogator.

Figure 8:
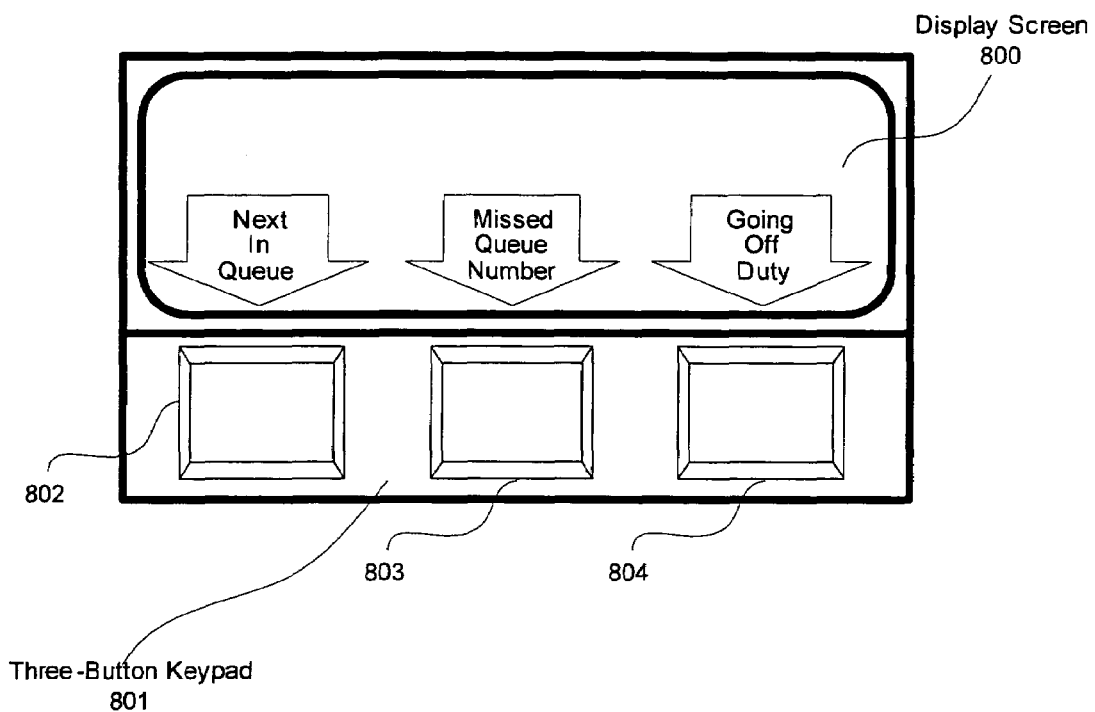
FIG. 8 shows an example of what would be displayed on the main screen of the transaction terminal described in FIG. 7.

An advantageous approach to the design of a user-interface is the use of "soft buttons", whereby the function of each button changes depending on the context and content of the display screen (701), and is defined for the user by labels displayed on the screen (701). FIG. 8 shows such an approach for the "Main Screen" functionally similar to that described above, except that rather than touching the touch screen (606) over a virtual button object displayed on the screen (701), the service person touches the button on the 3-button keypad (802) (e.g., the left-most button in FIG. 8) based on functional labels for the buttons shown on the display screen (800). Another important difference between the two illustrative embodiments shown in FIGS. 5 and 7 is that in FIG. 8 there is no service-person ID object (604), nor any "New Service-Person Log-In" button (605). Identification of the service person is accomplished by reading the identity of the RFID tag worn by the service person by means of the RFID-tag reader (702), for example as the bracelet comes into range of the reader when the hand nears the buttons on the keypad (704). Similarly, the log-in of a new service person occurs automatically upon the detection of a new RFID tag not already active in the server pool.

Instead of RFID tags, other types of tags which generate a signal upon being energized or activated by a transmission signal can be used in the invention.

Order Printer

Referring back to FIG. 1, orders placed through a computerized ordering channel (106) are printed out on the Order Printer (105) located in the order-fulfillment work area behind the counter, just as they are in the conventional set-up today except that, instead of being printed by the ordering application (106) immediately upon submission by customers, orders are printed under the control of the QM Application (101) when their associated queue numbers are called forward for service.

Customer Information Display

The Customer Information Display (104) comprises a large display screen and optionally one or more audio speakers mounted, for example, to the ceiling above a central location of the service counter. Its purpose is to provide service-queue information to customers whenever the service department is open for business. At a minimum, this information would include the "Now Serving" number, i.e., the queue position currently being served, as is shown on typical manual call-forward queue-management systems today, and could advantageously show the ordering channel (counter or kiosk) of the order currently being served. (The primary purpose of displaying the ordering-channel information is to explain to waiting counter customers why no customers are called forward when a kiosk orders is filled.) In addition, if not displayed on the ticket dispenser (102), the Customer Information Display (104) could show the next queue-position number ("Next Ticket" number) to be issued (the difference between the "Next Ticket" and "Now Serving" numbers being the number of customers already waiting in the service queue), and the predicted wait time for that next queue position. This information is updated automatically by the QM Application (101) as required, as will be taught more extensively below. Finally, the Customer Information Display (104) could optionally show marketing messages, including advertising.

Each time a new order is called forward for service, the "Now Serving" number is incremented to display that number. If this new order being served is from a counter customer, an audible computer-generated voice announcement is emitted via the audio speaker(s) to call the customer forward if the Customer Information Display (104) is equipped with speakers, otherwise the service person verbally calls out that queue-position number.

If the service counter is closed, the Customer Information Display (104) shows a message to that effect and preferably an advisory as to when it what the business hours are.

Multiple Customer Information Displays (104) can be provided, and if so, would be situated at different locations in and around the service area or store.

Issuing Service-Queue Numbers to Customers

A core function the QM Application (101) is to place customers into a service queue by issuing sequential queue-position numbers. Service-queue numbers are issued to counter customers through the ticket dispenser (102) and to kiosk customers through an interface to the ordering application software (106).

Issuance Through Ticket Dispenser

As described above, customers obtain queue tickets by pressing the button on the print-on-demand ticket dispenser (102), causing the QM Application (101) to print a ticket on the Dispenser's printer (202). At a minimum, the information printed on ticket will include a humanly-readable representation of the queue-position number assigned to the customer. The printed ticket could optionally also include a time-stamp showing the time the ticket was issued, the predicted queue-waiting time, the predicted time of service (time-of-issue plus queue-waiting time), a machine-readable (e.g. bar-coded) representation of the queue-position number, and various types of marketing messages (advertising, discount offers, etc.).

Issuance Through Electronic Ordering Application Software

The QM Application (101) issues queue numbers to kiosk customers through an Application Program Interface (API) with the electronic-ordering application (106) software. This API includes the following key elements of functionality:

The ordering application (106) can establish communication with the QM Application (101) and be granted the right to participate in the service queue on behalf of customers placing orders through it.

The ordering application (106) can request and receive from the QM Application (101) the current predicted queue-waiting time and predicted order-fulfillment time of the next order to be placed or any order already placed so that it can inform customers using this ordering channel when they can expect their order to be ready The ordering application (106) can reserve a position in the service queue for a customer placing an order in the same way that a customer reserves a position by pushing the ticket-demand button (201) on the ticket dispenser (102). In a preferred embodiment of the invention, this occurs when the customer commits/submits an order. While it would obviously be possible for the ordering application (106) to reserve a queue position earlier in the ordering process, the customer might not complete and submit the order before the queue number is called forward for service, which would complicate the queue-management process. If conversion of counter customers to kiosk customers is supported, the ordering application (106) can use an existing queue position, previously issued through the Ticket Dispenser (102), in placing an order, as will be discussed more fully below.

The ordering application (106) can submit the contents of the order from a customer waiting in the service queue after having reserved a queue position as just described. At a minimum, the contents of the order are simply a print image or character string, the sole use of which by the QM Application (101) is to send to the Deli printer (105) as described more fully below. The ordering application (106) can also advantageously include information about the contents of the order that the QM Application (101) can use to better estimate the time that will be required to fulfill the order, such as the number of items in the order or, at the most detailed level, the identity of each type of item ordered and attributes of each (such as quantity, thickness of slice, etc.).

The ordering application (106) can receive from the QM Application (101) the status of an order previously placed. This will happen either when the ordering application (106) requests the status (for example, in response to a request by a customer), or when the QM Application (101) automatically provides this information upon change in an order's status. An order's status can be: "Waiting" (still in the service queue), "In Process" (a service person has begun filling the order), or "Complete".

The ordering application (106) can cancel a previously submitted order, provided that the status of that order is still "Waiting". In this case, the QM Application (101) will simply skip over the previously assigned queue number in processing transactions, as if it had never been issued.

Conducting Service Transactions

Service personnel process customer orders in the service queue by interacting with the QM Application (101) through Service-Transaction Terminals (103), any number of which can be distributed within the work area for the convenience of the service personnel. Any service person can use any transaction terminal (103) at any time. Each transaction is enabled by the identification of the service person conducting the transaction, and is initiated by pressing one of three transaction buttons on the terminal (103). If the transaction terminal is the non-RFID embodiment (503) illustrated in FIG. 5, the service person must first touch his/her identification object before touching a transaction button. If the terminal is the RFID-enabled embodiment (700) illustrated in FIG. 7, the identification of the service person is accomplished transparently by reading the RFID tag worn by the service person. In the absence of identification, for example if the service person fails to touch his/her ID object or fails to wear the RFID tag, the transaction buttons are not active and touching them has no effect.

Each of the three possible transactions is described below: "Next in Queue" (601), "Missed Queue Number" (602), and "Going Off Duty" (603) (see FIG. 6).

Next in Queue

The Next-In-Queue transaction button (601) calls forward the next customer in the service queue to place an order. In a preferred embodiment, once this button (601) has been pressed, the QM Application (101) performs the following steps It displays to the service person necessary information about this order on the terminal screen (103), namely the queue number of the next order to be fulfilled and where the service person will find the order information (counter customer or printer (105)).

It increments the "Now Serving" number, displayed on the Customer Information Display (104) (this will be the same queue number displayed on the Transaction Terminal (103)), and displays an icon, picture, or other graphical object indicative of the ordering channel (e.g., counter or kiosk) through which the order is being placed.

If the next order in queue is a counter customer, and if the Customer Information Display (104) includes the optional speakers, the QM Application (101) causes a digital audio voice message to be emitted through the speakers announcing the "Now Serving" number. (If the Customer Information Display (104) does not include these speakers, the service person fulfilling the order calls out the queue number.) The customer holding the queue ticket must then answer the call forward, present the ticket to the service person in order to validate his/her queue position, and verbally communicate the order. If no customer answers the call within a reasonable time, the queue position is considered abandoned and the service person is free to initiate another service transaction.

If the order being served is from a kiosk customer, the QM Application (101) prints the order on the Order Printer (105), and preferably sends a status update to the Deli Application (101) to reflect the change in order status from "Waiting-In-Queue" to "In-Process". The information on the printed order would advantageously include the queue number and the contents of the order based on the information provided by the ordering application (106) at the time the order was submitted.

Missed Queue Number

The most common business rule for handling the situation when a customer misses the call forward of his/her queue number and returns to the service counter requesting service is to have the next available service person take the order, allowing the missed queue number to maintain its priority since it is lower than any number still waiting for service. The purpose of the "Missed Queue Number" (602) transaction is to enable the QM Application (101) to account for such out-of-sequence order fulfillment while still maintaining the integrity of the queue. The service person taking the order simply presses the "Missed Queue Number" transaction button (602) instead of the "Next-In-Queue" button (601) and takes the order from the customer. Obviously, there is no need for a call-forward announcement, and the "Now Serving" number shown on the Customer Display (104) does not change.

Going Off Duty

The Going-Off-Duty transaction button (601) is used by service personnel to take themselves out of the active server pool, either temporarily (e.g., they need to perform other tasks, such as prep, cleanup) or permanently (e.g., end of shift)

Transaction Completion

The touch of either a "Next-In-Queue" (601) or "Missed-Queue-Number" transaction button (602) marks the start of a service transaction, but there is no explicit completion-of-transaction input into the QM Application (101). Instead, the next touch of any of the transaction buttons by the same service person is automatically considered to mark the end of the previous transaction by that server. Upon the completion of a Next-In-Queue transaction (601) for an order from a kiosk customer, the QM Application (101) preferably sends a status update to the ordering application (106) to reflect the change in order status from "In-Process" to "Complete".

Boundary Conditions

No Orders in Queue

Figure 9B:
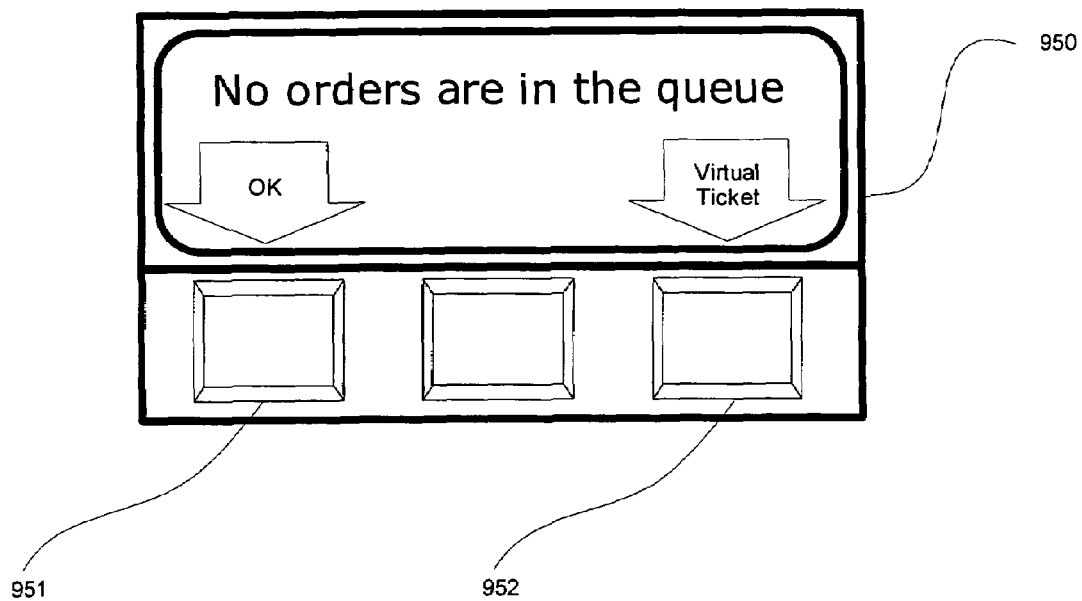
FIG. 9b shows what would be displayed on the screen of the RFID-enabled transaction terminal shown in FIG. 6 under the same circumstance.

Service personnel have no way of knowing when all of the orders waiting in the service queue have been completed; they certainly cannot infer this from the absence of customers waiting in front of the service counter since there can be orders placed through an electronic ordering application (106) still in the queue, or customers shopping nearby may be listening for their queue numbers to be announced. For this reason (and to capture the completion of a finished order), service personnel must always press one of the three transaction buttons when finished with an order, even if there are no customers waiting at the counter. It will thus be commonplace for a service person to initiate a "Next-In-Queue" transaction (601) when there is not another number in the queue. In this case, the QM Application (101) displays a message on the Service-Transaction Terminal screen (900) that there are no orders in the queue, along with an "OK" button (901) and a "Virtual Ticket" button (902) (to be explained below). FIG. 9a and FIG. 9b depict such a display on the non-RFID-enabled (900) and RFID-enabled (950) embodiments of the Service-Transaction Terminal, respectively. Upon the touch of the "OK" button (901), or after a timeout period with no touch of either button, the terminal returns to the main page (600 or 800).

New Order when Queue is Empty

A common boundary condition, especially during non-peak demand periods, is the appearance of a new customer when the service queue is empty. This condition requires two features within the QM Application (101): the New-Order Alert, and the Virtual Ticket (902).

New-Order Alert

When the queue is empty and a new queue position is assigned to a kiosk customer or even a counter customer, it may be the case that no service person is aware that a "Next-In-Queue" (601) transaction is required. It is therefore highly advantageous for the QM Application (101) to generate a "New Order Alert". For example, such an alert could be communicated through the optional speaker system in the Customer Information Display (104), and/or by continuously flashing a message on all of the Service-Transaction Terminals (103).

Virtual Ticket

If the service queue is empty and a counter customer asks to place an order without having taken a ticket, a business rule that forces the customer to take a ticket from the ticket dispenser may be perceived by the customer to be arbitrary and even demeaning. Instead, a service person can simply initiate the "Next-In-Queue" transaction (601) to confirm that the queue is empty, and if that is the case, press the "Virtual Ticket" button (902) mentioned above. The QM Application (101) treats the touch of the Virtual Ticket button (902) as a near-simultaneous press of the ticket-demand button (201) on the ticket dispenser (102) by the customer and press of the "Next-In-Queue" button (601) by the service person, except that no ticket is printed and there is no automated voice announcement accompanying the incrementing of the "Now-Serving" number on the Customer Information Display (104).

In order to maintain the integrity of the service queue, once the Virtual Ticket button (902) has been displayed, the QM Application (101) must reserve the next queue number for use by the Virtual-Ticket button (902) for a timeout period, even if other customers submit orders through an electronic ordering application (106) or request a ticket from the ticket dispenser (102). Rather than locking the queue, and having to delay responding to the ordering application (106) or printing a ticket, QM Application (101) can hold the next queue number for the virtual ticket, and assign the next higher numbers to subsequent requests for queue numbers. If the Virtual Ticket button (902) is not touched, the reserved queue number will simply not be issued. (If another queue number has been issued, though, the audible New Order Alert should be generated, since another Next-In-Queue transaction is needed.)

Converting Counter Customers to Kiosk Customers

It might occasionally happen that a counter customer, having reserved a queue position through the Ticket Dispenser (102), has a change of mind and now wishes to place his/her order electronically through the kiosk computer instead of waiting to place it directly with a service person. Since customers typically place significantly larger orders through the kiosk computer than through counter service, it would be commercially desirable to encourage kiosk ordering in every way possible. Therefore, a potentially advantageous feature of the QM Application (101) is to allow counter customers who have such a change of mind to place their orders via the kiosk computer without losing their position within the service queue, in other words to convert their queue positions from the counter-customer channel to the kiosk-customer channel. For example, in a preferred embodiment, each ticket issued by the Ticket Dispenser (102) carries a bar-coded representation of the assigned queue number, and an ordering kiosk computer has an integrated barcode scanner. With this embodiment, a customer can scan that barcode at the kiosk computer, causing the ordering application software to pass the queue number to the QM Application (101) and preserve its queue priority for the order that the customer subsequently places through the kiosk.

Estimating Queue-Waiting Time and Time-To-Completion

By tracking how many people are in the active server pool at all times, the QM Application (101) can estimate queue-waiting time and time-to-completion for each order for the purpose of providing customers with a realistic expectation of service level. Counter customers will be primarily interested in the predicted queue-waiting time to know how long they must wait to place their order or when to return to answer the call forward, whereas kiosk customers will be primarily interested in predicted time-to-completion to know how soon they will be able to pick-up their order.

The method for estimating these times in a preferred embodiment is essentially a forward-looking simulation of the processing of orders in the service queue. This simulation will be run anytime there is an event or condition that requires a recalculation of predicted wait time, as will be discussed more fully below. The key step in this simulation is first to estimate the order-fulfillment time for each order in the service queue. Thus, each time an order in the service queue is assigned to a service associate, the QM Application (101) uses its predicted fulfillment time for that order to predict when that service associate will become available to fill another order. The complete process simulation is an iterative sequence of looking ahead in time and "assigning" each order in the service queue to the predicted next-available service associate, predicting a completion time for that order by adding its predicted fulfillment time to its predicted start time (the predicted completion time of the previous order for that server), until the start-times and completion-times have been predicted for every order in the queue.

The predicted queue-waiting time for any given order is simply the difference between the current clock time and the predicted start time for that order, and the time-to-completion is the difference between current clock time and predicted completion time for the order.

The accuracy of these predicted queue-waiting times and times-to-completion is primarily a function of the accuracy of the predicted fulfillment time for each order in the queue, and it is possible to apply very sophisticated analytical techniques to historical data produced by the system to make those estimates. For example, since the exact contents of each order submitted through an electronic ordering system are known, the QM Application (101) can estimate the order-fulfillment times for those orders based on that information. At a minimum, the number of items can be used, i.e., a standard fulfillment-time-per-item can be multiplied by the number of items. With much more extensive analysis of actual order-fulfillment-time data, the predicted fulfillment time for each item in the order could be based on the type of item being ordered (e.g., meat, cheese, salad, etc.) as well as ordering attributes (e.g., quantity or weight, slice-thickness, etc.). Such a granular level of prediction is not possible for counter customers since the contents of the order is never known by the system, but the prediction might well take into account day-of-week and/or time-of-day. Finally, if named-identification mode is used, the predicted fulfillment time for each order could take into consideration the historical productivity of the specific service associate predicted to fulfill each order.

As mentioned above, this simulation should be run whenever there is an event or condition that requires a recalculation of predicted wait time, specifically:

When a new customer joins the service queue;

When there is a change in the composition of the server pool as a result of a New-Server-Login or a Going-Off-Duty transaction;

When the current clock time goes past the predicted completion time for any order, indicating that the actual fulfillment time of that order is greater than the original estimate used in the simulation. In this event, a new completion time is predicted and the simulation is rerun.

Once a simulation has been run and the queue-waiting time for the next queue number to be issued has been predicted, the system can simply adjust it continuously based on the elapsed time since the simulation. For example, if the predicted queue-waiting time is 5 minutes and 10 seconds from a simulation run at exactly 3:00:00 PM, then at 3:00:15 (15 seconds later), the predicted queue-waiting time would be 4 minutes and 55 seconds, i.e., 15 minutes less than the original estimate.

Simulation Example

A simplified example of such a simulation, run at 5:32:00 PM on a weekday, is shown in FIGS. 10*a*-10*e*. In this example, as shown in FIG. 10*a*, analysis of historical order-fulfillment times has shown that the average length of time required by an average service person to fulfill an order can be predicted by multiplying the number of items in the order by 2.1 "standard" minutes per item. In addition, analysis of historical demand shows that the size of an average order from a counter customer varies based on day of week and time of day, with weekend orders averaging 3.2 items per order and weekday orders averaging 3.0 items per order during the busy evening hours and 2.5 items per order during the rest of the day.

At the time of the simulation in this example, the pool of service personnel fulfilling orders consists of three people: John, Mary, and Fred. As depicted in FIG. 10*b*, the "Productivity Indices" for these service people, based on historical analysis of their order-fulfillment times, are 1.1, 1.0, and 0.9, respectively. This means that Mary's productivity (Index 1.0) is exactly average, i.e., she can fill orders on average at the standard rate of 2.1 minutes per item. John (Index 1.1) takes 10% longer on average to fill orders (or 2.3 minutes per item on average), and Fred (Index 0.9) takes 10% less time on average (1.9 minutes per item).

At the time of the simulation depicted in this analysis, there are six customers waiting in the service queue. As shown in FIG. 10*c*, these customers have been assigned queue numbers 55 through 60 inclusive. Queue numbers 55, 57, and 60 have been issued to counter customers, while queue numbers 56, 58, and 59 have been issued to kiosk customers. Since the simulation in this example occurs at 5:32 PM (evening) on a weekday, counter customers are assumed to order 3.0 items each, on average, so that the "standard" fulfillment time (i.e. by a service person of average productivity) is predicted at 6.3 minutes for orders 55, 57, and 60. The standard fulfillment times for kiosk orders 56, 58, and 59 are predicted at 8.4 minutes, 6.3 minutes, and 10.5 minutes based on order sizes of 4 items, 3 items, and 5 items, respectively.

FIG. 10*d* shows the actual simulation of the servicing of the queue in this example, which is triggered by Mary initiating a "Next-In-Queue" transaction at 5:32 PM. She is assigned the next queue number to be called forward for service, i.e., 55, a counter customer. The predicted fulfillment time for this order is calculated by multiplying Mary's Productivity Index (1.0) times the standard fulfillment time (6.3 minutes for a counter customer), or 6.3 minutes. Mary is then predicted to become free again at 5:38:18 PM, calculated by adding 6 minutes 18 seconds to the current clock time of 5:32:00 PM.

Next, the simulation looks for the next available service person to take queue number 56. Since John is predicted to finish the order he is working on at 5:34:56 PM, which is earlier than Fred at 5:35:41 PM, the simulation "assigns" queue number 56 to John. The predicted fulfillment time for this order is calculated by multiplying the standard predicted time (8.4 minutes) by John's Productivity Index (1.1), yielding 9.2 minutes, which is then added to the predicted start time of 5:34:42 PM to predicted a time-of-completion of 5:43:56 PM. Next, the simulation "assigns" queue number 57 to Fred, predicted to start at 5:35:41 PM and take 5.7 minutes (6.3 standard minutes times Fred's Productivity Index of 0.9), completing at 5:41:21 PM.

This procedure continues, then, until all waiting queue numbers have been assigned. Queue number 58 is assigned to Mary, predicted to start at 5:38:18 PM and complete at 5:44:36 PM. Queue number 59 is assigned to Fred, predicted to start at 5:41:21 PM and complete at 5:50:48 PM. Finally, queue number 60 is assigned to John, predicted to start at 5:43:56 PM and complete at 5:50:51 PM.

Based on this simulation, the next queue number to be issued, i.e. number 61, would be assigned to Mary with a predicted call-forward time of 5:44:36 PM. The predicted queue-waiting time for this next queue number to be issued is therefore 12 minutes 36 seconds (the difference between 5:44:36 PM and current time of 5:32:00 PM). Thirty seconds later, at 5:32:30 PM, the predicted queue-waiting time will be 12 minutes 6 seconds, assuming that no event has occurred to require a new simulation.

Service-Level Alerting

An important feature of the present invention, resulting from its real-time monitoring of service levels, is the ability to generate an alert to management when the service level exceeds a threshold of acceptability. This alerting capability enables management to react immediately to sudden or unexpectedly large peaks in demand by adding service personnel to the server pool, thereby increasing the rate of fulfillment throughput, reducing queue-waiting times, and maintaining acceptable customer-service levels. A preferred measure of service level to use in generating this alert is the predicted queue-waiting time for the next position in the queue, such that when this measure exceeds a specified threshold, an alert is sent to one or more designated recipients.

Having described preferred embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method for integrating into a single service queue managed by a control computer order-fulfillment service-requests from customers to a provider of goods or services through multiple ordering channels, comprising:
    enabling customers to request service from the provider though a plurality of ordering channels;
    arranging the service-requests in a single service queue using at least one service-transaction terminal connected to said control computer based on the time at which each is placed regardless of the ordering channel used;
    providing at least one ticket dispenser which dispenses tickets and thus constitutes a first ordering channel whereby upon activation of the at least one ticket dispenser, a customer requests fulfillment service for an order to be placed by the customer to a service person and receives a ticket having the next number in the service queue, wherein each of said at least one ticket dispenser includes a printer and a manually-activated device which when activated, causes printing of a ticket by said printer with the next number in the service queue and enables access to the thus-printed ticket, wherein said printer and said manually-activated device independently communicate with said control computer.

2. The method of claim 1, further comprising: calling forward each queue number for service when it has reached the top of the service queue so that the customer having received the queue number can place the order with the service person.

3. The method of claim 2, further comprising
    providing a communications link between the control computer which manages the service queue and at least one computer running an electronic ordering software application; and
    enabling the control computer to accept orders from the electronic ordering computer which thus constitutes a second ordering channel such that a customer is able to simultaneously request order fulfillment service and place the order for goods or services from the provider using the computer and receives the next number in the service queue when the order is placed.

4. The method of claim 2, further comprising constructing the ticket dispenser with a manually-activated device which causes printing of the ticket with the next number in the service queue and enables access to the thus-printed ticket.

5. The method of claim 1, further comprising
    providing a communications link between the control computer which manages the service queue and at least one computer running an electronic ordering software application; and
    control of said control computer, accepting orders from the electronic ordering computer which thus constitutes a first ordering channel such that a customer requests order fulfillment service and places the order for goods or services using the electronic ordering computer and said control computer processes said request for order fulfillment service and sends the next number in the service queue to the electronic ordering computer when the order is placed.

6. The method of claim 1, further comprising, under control of said control computer, tracking individuals fulfilling service-requests and data about service-request fulfillment and using the tracked information to compile data about the individuals and their fulfillment of service-requests.

7. The method of claim 6, further comprising, under control of said control computer, predicting the wait time for the next number in the service queue utilizing said compiled data and displaying the predicted wait time.

8. The method of claim 1, further comprising, under control of said control computer, predicting the wait time for the next number in the service queue utilizing data about service-requests in the service queue and displaying the predicted wait time.

9. The method of claim 8, further comprising, under control of said control computer, directing a message to a system monitor when the predicted wait time exceeds a threshold to enable additional individuals to be added to a server pool.

10. A system for integrating multiple customer ordering channels into a single service queue to obtain goods or services from a service location of a provider, comprising:
    a control computer;
    at least one ticket dispenser connected to said control computer and arranged to dispense tickets upon activation; and
    computerized ordering means connected to said control computer for enabling placement of orders for goods or services using a processor linked to said control computer;
    said control computer being arranged to assign the next number in the service queue to an order placed via said computerized ordering means or to a ticket dispensed from said at least one ticket dispenser based on the time at which the ticket is dispensed from said at least one ticket dispenser or the order is placed via said computerized ordering means; and
    wherein each of said at least one ticket dispenser includes a printer and a manually-activated device which when activated, causes printing of a ticket by said printer with the next number in the service queue and enables access to the thus-printed ticket, wherein said printer and said manually-activated device independently communicate with said control computer.

11. The system of claim 10, wherein said at least one ticket dispenser includes a display, said control computer being arranged to predict the wait time for the next number in the service queue based on orders in the service queue and cause display of the predicted wait time on said display.

12. The system of claim 10, wherein said at least one ticket dispenser includes a proximity detector for detecting approach of an individual to said at least one ticket dispenser to enable analysis of the number of individuals approaching said at least one ticket dispenser and the number of individuals activating said at least one ticket dispenser.

13. The system of claim 10, wherein said at least one ticket dispenser comprises:
a housing;
a printer arranged in said housing for printing the tickets;
a manually-activated device arranged on said housing;
a display arranged in connection with said housing; and
a processor arranged in said housing and coupled to said printer, said manually-activated device and said display, said processor directing said printer to print a ticket when said manually activated device is activated and communicating with said control computer to provide data to said control computer relating to the printing of ticket by said printer and receive data from said control computer to control said display to display a predicted wait time.

14. The system of claim 10, wherein said at least one ticket dispenser comprises:
a housing;
a printer arranged in said housing for printing the tickets;
a manually-activated device arranged on said housing;
a display arranged in connection with said housing; and
a processor arranged in said housing and coupled to said printer, said manually-activated device and said display, said processor communicating with said control computer to receive data from said control computer to control said display to display a predicted wait time and provide data to said control computer relating to activation of said manually-activated device, said control computer being arranged to direct said printer to print a ticket when said manually-activated device is activated.

15. The system of claim 14, further comprising a device server arranged in said housing and connected to said processor and said printer, said server managing communications between said processor and said printer of said at least one ticket dispenser and said control computer.

16. The system of claim 10, wherein said at least one ticket dispenser is arranged to print tickets including one or more of: a time-stamp showing the time the ticket was issued, a predicted wait time to commence service by an individual fulfilling the orders, a predicted time of service and an advertising or marketing message.

17. The system of claim 10, further comprising at least one service-transaction terminal connected to said control computer and arranged to interact with one or more individuals who provide the goods or services.

18. The system of claim 17, wherein said at least one service-transaction terminal is arranged to associate an individual with fulfillment of each order and track start and completion times of each order being fulfilled.

19. The system of claim 17, further comprising arranging said at least one service-transaction terminal to accept input relating to an identification of the individual fulfilling the order.

20. The system of claim 17, wherein said control computer controls said at least one service-transaction terminal to indicate the individual currently fulfilling an order, enable an order fulfiller to call the next customer in the service queue, and enable the order fulfiller to serve a customer having a number earlier in the service queue.

21. The system of claim 20, wherein said control computer further controls said at least one service-transaction terminal to allow changes in the indication of the individual fulfilling orders and the number of individuals fulfilling orders.

22. The system of claim 17, wherein said at least one service-transaction terminal includes a display and a touch-sensitive screen overlay.

23. The system of claim 17, further comprising wireless tags adapted to be worn by the individuals and each of which generates different wireless signals, said at least one service-transaction terminal including an interrogator for receiving the wireless signals generated by said wireless tags and thereby enabling identification of the individuals to be associated with fulfillment of each order.

24. The system of claim 23, wherein said at least one service-transaction terminal further includes a display screen, an entry device associated with said display screen and a processor coupled to said display screen and said entry device to correlate input via said entry device with functions displayed on said display screen.

25. The system of claim 17, wherein said at least one service-transaction terminal includes means for enabling generation of a virtual ticket to enable an individual fulfilling orders to fulfill an order not entered through said computerized ordering means or after activation of said at least one ticket dispenser.

26. The system of claim 10, further comprising at least one order printer connected to said control computer for printing out orders received via said computerized ordering means.

27. The system of claim 26, wherein said control computer controls said at least one order printer to print out orders only when the number of the order is the number in the service queue to be fulfilled.

28. The system of claim 10, further comprising at least one display, said control computer being arranged to determine a predicted wait time for the next number in the queue based on orders in the service queue and display the number of the order currently being fulfilled and the predicted wait time on said at least one display.

29. The system of claim 10, wherein said computerized ordering means are arranged to provide a predicted wait time to commence service by an individual fulfilling the orders and a predicted time of service.

30. The system of claim 10, wherein said computerized ordering means comprise at least one processor-containing kiosk linked to said control computer.

31. The system of claim 10, wherein said computerized ordering means are arranged to provide the contents of the order to said control computer.

32. The system of claim 10, wherein said computerized ordering means are arranged to enable alteration of a previously placed order, obtain an update on the status of fulfillment of a previously placed order and enable cancellation of a previously placed order.

33. The system of claim 10, further comprising alert means to alert individuals fulfilling orders of the presence of a new order.

34. The system of claim 10, further comprising means for enabling conversion of a ticket dispensed by said at least one ticket dispenser into an order entered via said computerized ordering means while maintaining position in the service queue.

35. The system of claim 10, wherein said control computer is arranged to predict the wait time for the next number in the service queue based on orders in the service queue and direct a message to a system monitor when the predicted wait time exceeds a threshold to enable additional individuals to be added to a server pool.

* * * * *